US008515741B2

(12) United States Patent
Mpr

(10) Patent No.: US 8,515,741 B2
(45) Date of Patent: Aug. 20, 2013

(54) SYSTEM (S), METHOD (S) AND APPARATUS FOR REDUCING ON-CHIP MEMORY REQUIREMENTS FOR AUDIO DECODING

(75) Inventor: Srinivasa Mpr, Karnataka (IN)

(73) Assignee: Broadcom Corporation, Irvine, CA (US)

( * ) Notice: Subject to any disclaimer, the term of this patent is extended or adjusted under 35 U.S.C. 154(b) by 2593 days.

(21) Appl. No.: 10/871,812

(22) Filed: Jun. 18, 2004

(65) Prior Publication Data

US 2005/0283370 A1 Dec. 22, 2005

(51) Int. Cl.
*G10L 19/02* (2013.01)
*G06F 13/00* (2006.01)

(52) U.S. Cl.
USPC ......... 704/200.1; 704/500; 704/501; 711/104

(58) Field of Classification Search
USPC .............. 704/500, 501, 503, 504, 200, 200.1, 704/230; 711/104, 105; 710/22, 52; 375/245; 341/65
See application file for complete search history.

(56) References Cited

U.S. PATENT DOCUMENTS

| | | | | |
|---|---|---|---|---|
| 5,615,020 | A * | 3/1997 | Keith | 382/246 |
| 5,648,778 | A * | 7/1997 | Linz et al. | 341/110 |
| 5,706,392 | A * | 1/1998 | Goldberg et al. | 704/200.1 |
| 5,815,206 | A * | 9/1998 | Malladi et al. | 375/240.01 |
| 5,884,269 | A * | 3/1999 | Cellier et al. | 704/501 |
| 6,055,619 | A * | 4/2000 | North et al. | 712/36 |
| 6,098,174 | A * | 8/2000 | Baron et al. | 713/300 |
| 6,259,957 | B1 * | 7/2001 | Alexander et al. | 700/94 |
| 6,301,603 | B1 * | 10/2001 | Maher et al. | 718/105 |
| 6,380,945 | B1 * | 4/2002 | MacInnis et al. | 345/602 |
| 6,625,740 | B1 * | 9/2003 | Datar et al. | 713/324 |
| 6,628,999 | B1 * | 9/2003 | Klaas et al. | 700/94 |
| 6,643,744 | B1 * | 11/2003 | Cheng | 711/137 |
| 7,080,011 | B2 * | 7/2006 | Baumgartner et al. | 704/231 |
| 7,574,274 | B2 * | 8/2009 | Holmes | 700/94 |
| 7,685,607 | B2 * | 3/2010 | Frank et al. | 719/318 |
| 8,244,512 | B1 * | 8/2012 | Tseng et al. | 703/14 |
| 2002/0065665 | A1 * | 5/2002 | Hamasaki et al. | 704/500 |
| 2002/0145613 | A1 * | 10/2002 | MacInnis et al. | 345/603 |
| 2005/0099326 | A1 * | 5/2005 | Singhal et al. | 341/67 |
| 2005/0234571 | A1 * | 10/2005 | Holmes | 700/94 |
| 2007/0160142 | A1 * | 7/2007 | Abrams | 375/240.12 |

* cited by examiner

*Primary Examiner* — Martin Lerner
(74) *Attorney, Agent, or Firm* — Thomas | Horstemeyer, LLP

(57) ABSTRACT

Presented herein are system(s), method(s), and apparatus for reducing on-chip memory requirements for audio decoding. In one embodiment, there is presented a method for decoding encoded audio signals. The method comprises fetching a first one or more tables from an off-chip memory; loading the first one or more tables to an on-chip memory; applying a first function to the encoded audio signals using the first one or more tables; fetching a second one or more tables from an off-chip memory after applying the first function; loading the second one or more tables to an on-chip memory; and applying a second function to the encoded audio signals, using the second one or more tables.

20 Claims, 4 Drawing Sheets

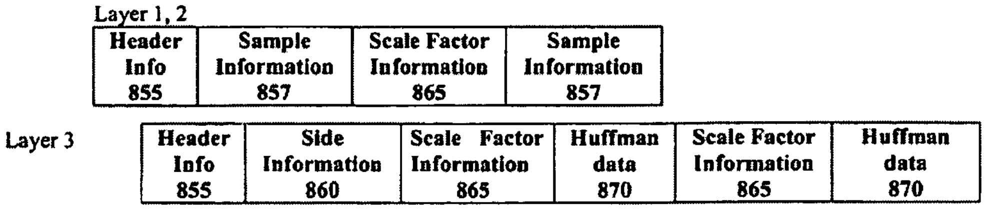
FIGURE 1
FIGURE 2
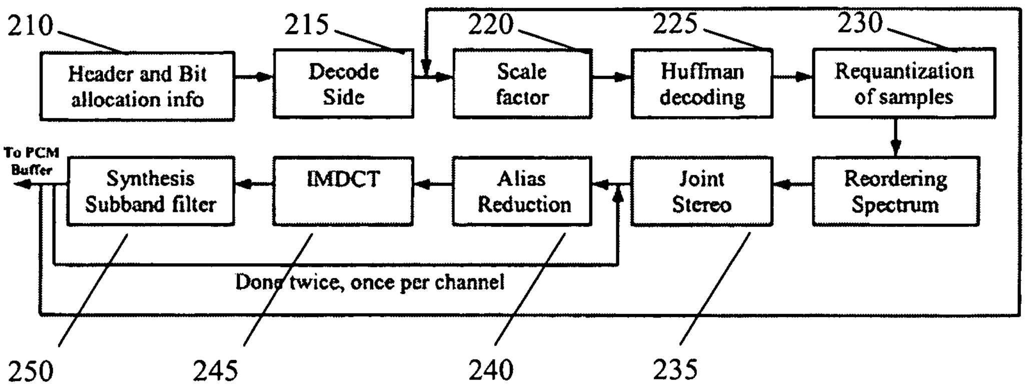

SYSTEM (S), METHOD (S) AND APPARATUS FOR REDUCING ON-CHIP MEMORY REQUIREMENTS FOR AUDIO DECODING

BACKGROUND OF THE INVENTION

Audio standards, such as MPEG-1, Layer 3 (also known as, and now referred to as MP3) employ lossy and lossless compression to reduce the memory and bandwidth requirements for storing and transmitting audio data.

During lossy compression, some of the original data is lost. Lossy compression includes digitization, windowing, time to frequency domain transformation, and quantization. A stochastic model of the human ear determines imperceptible portions of the original data. Accordingly, lossy compression realizes significant compression without perceptible degradation of the original signal. After lossy compression, the audio signal is represented by a series of symbols.

Lossless compression uses a variety of variable length codes for coding the symbols. The variable length codes for the symbols are designed to assign shorter codes to the most frequently occurring symbols and longer codes to the least frequently occurring symbols. The coding schemes include a number of tables that map the different symbols to different codes.

The encoded audio signal can then be transmitted and stored at a receiving terminal with an audio decoder. During play of the audio signal, the audio decoder decodes the variable length codes, inverse quantizes, transforms to the time domain, and dewindows the encoded audio signal, thereby reconstructing the original audio signal. Preferably, the foregoing occurs in real time, because most applications would require playing the audio signal at a specified speed.

The audio decoder is usually an integrated circuit. The audio decoder uses tables that map the different symbols to different codes to decode the variable length codes. The tables occupy approximately 50 KB of memory. In an integrated circuit, the amount of on-chip memory is limited and expensive. Although off-chip memory is less limited and less expensive, accessing off-chip memory is typically slower. Accessing the tables from off-chip memory may be too slow for audio decoding in real time.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

Presented herein are system(s), method(s), and apparatus for reducing on-chip memory requirements for audio decoding.

In one embodiment, there is presented a method for decoding encoded audio signals. The method comprises fetching a first one or more tables from an off-chip memory; loading the first one or more tables into an on-chip memory; applying a first function to the encoded audio signals using the first one or more tables; fetching a second one or more tables from an off-chip memory after applying the first function; loading the second one or more tables into an on-chip memory; and applying a second function to the encoded audio signals, using the second one or more tables.

In another embodiment, there is presented an integrated circuit for decoding encoded audio signals. The integrated circuit comprises a direct memory access module, a memory, and an audio decoder. The direct memory access module fetches a first one or more tables from an off-chip memory. The memory stores the first one or more tables. The audio decoder applies a first function to the encoded audio signals using the first one or more tables. The direct memory access module fetches a second one or more tables from an off-chip memory after the audio decoder applies the first function. The memory stores the second one or more tables. The audio decoder applies a second function to the encoded audio signals, using the second one or more tables.

In another embodiment, there is presented an integrated circuit for decoding encoded audio signals. The integrated circuit comprises a memory, a direct memory access module, and an audio decoder. The direct memory access module is connected to the memory, and operable to fetch a first one or more tables from another memory and write the first one or more tables to the memory. The audio decoder is operably connected to access the first tables from the memory, and equipped to apply a first function to the encoded audio signals using the first one or more tables. The direct memory access module is operable to fetch a second one or more tables from the another memory after the audio decoder applies the first function and write the second one or more tables to the memory. The audio decoder is equipped to apply a second function to the encoded audio signals, using the second one or more tables.

These and other advantages, aspects and novel features of the invention, as well as details of illustrative aspects thereof, will be more fully understood from the following description and drawings.

BRIEF DESCRIPTION OF SEVERAL VIEWS OF THE DRAWINGS

FIG. 1 is a block diagram describing the encoding of audio signals;

FIG. 2 is a block diagram describing an exemplary audio decoder in accordance with an embodiment of the present invention;

DETAILED DESCRIPTION OF THE INVENTION

Figure 3:
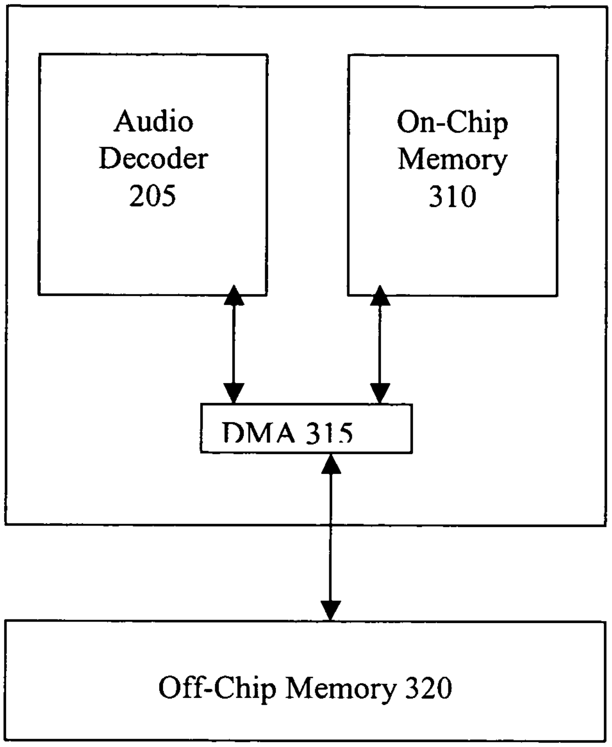
FIG. 3 is a block diagram describing an exemplary integrated circuit in accordance with an embodiment of the present invention.

FIG. 1 is a block diagram 800C illustrating encoding of an exemplary audio signal A(t) 810C by the MPEG encoder according to an embodiment of the present invention. The audio signal 810C is sampled and the samples are grouped into frames 820C ($F_0 \ldots F_n$) of 1024 samples, e.g., ($F_x(0) \ldots F_x(1023)$). The frames 820C ($F_0 \ldots F_n$) are grouped into windows 830C ($W_0 \ldots W_n$) that comprise 2048 samples or two frames, e.g., ($W_x(0) \ldots W_x(2047)$). However, each window 830C $W_x$ has a 50% overlap with the previous window 830C $W_{x-1}$.

Accordingly, the first 1024 samples of a window 830C $W_x$ are the same as the last 1024 samples of the previous window 830C $W_{x-1}$. A window function w(t) is applied to each window 830C ($W_0 \ldots W_n$), resulting in sets ($wW_0 \ldots wW_n$) of 2048 windowed samples 840C, e.g., ($wW_x(0) \ldots wW_x(2047)$). The modified discrete cosine transformation (MDCT) is applied to each set ($wW_0 \ldots wW_n$) of windowed samples 840C ($wW_x(0) \ldots wW_x(2047)$), resulting sets ($MDCT_0 \ldots MDCT_n$) of 1024 frequency coefficients.

The sets of frequency coefficients are then quantized and coded with Huffman symbols 870. Header information 855, side information 860, and scale factors 865 are also added. The header information 855, the side information 860, and the scale factors 865 are encoded with variable length codes.

The Huffman coding and the variable length codes for the symbols are designed to assign shorter codes to the most frequently occurring symbols and longer codes to the least frequently occurring symbols. The coding schemes include a number of tables that map the different symbols to different codes.

In MPEG-1, layer 1 or 2, what is known as the audio elementary stream AES, comprises the header information 855, sample information 857, and scale factors 865. In MPEG-1, Layer 3, the AES comprises the side information 860, the scale factors 865, and the Huffman data 870. The AES can be multiplexed with other AESs. The multiplexed signal, known as the Audio Transport Stream (Audio TS) can then be stored and/or transported for playback on a playback device. The playback device can either be local or remotely located.

Where the playback device is remotely located, the multiplexed signal is transported over a communication medium, such as the Internet. During playback, the Audio TS is demultiplexed, resulting in the constituent AES signals. The constituent AES signals are then decoded, resulting in the audio signal.

Referring now to FIG. 2, there is illustrated a block diagram describing an exemplary audio decoder 205 in accordance with an embodiment of the present invention. The audio decoder 205 comprises a header and bit allocation information processing module 210, a side information decoder 215, a scalar 220, a Huffman decoder 225, an inverse quantizer 230, joint stereo module 235, an alias reducer 240, an IMDCT module 245, and a synthesis sub-band filter 250. Each of the foregoing can be implemented, for example, as hardware accelerator units under the control of a processor or controller. Each of the foregoing use different tables for decoding. The tables occupy approximately 50 KB of memory.

Referring now to FIG. 3, there is illustrated a block diagram describing an exemplary integrated circuit, configured in accordance with an embodiment of the present invention. The integrated circuit comprises an audio decoder 205 and on-chip memory 310. The audio decoder 205 also has access to off-chip memory 320.

The on-chip memory 310 can comprise Static Random Access Memory (SRAM). The on-chip memory 310 is generally expensive, and consumes a significant portion of the physical area of the integrated circuit. The off-chip memory 320 can comprise Dynamic Random Access Memory (DRAM) and is generally cheaper than the on-chip memory 310. However, the off-chip memory 320 is also slower than the on-chip memory 310.

The off-chip memory 320 stores each of the tables required by the portions of the audio decoder 205. When specific portions of the audio decoder 205 decode the AES, a direct memory access module 315 fetches the appropriate tables from the off-chip memory 320 and loads the tables to the on-chip memory 310.

The tables that are stored in the off-chip memory 320 are listed below for Layers 1, 2, and 3.

| | |
|---|---|
| Tables for Layers 1 and 2 | |
| MP3_bitrate[2][3][15] | 90 |
| MP3_size_conv[2][4] | 8 |
| MP3_decode_info_N[12] | 12 |
| MP3_MainDataSlots[2][4][15] | 90 |
| MP3_s_freq[2][4] | 8 |
| MP3_L2_alloc_table0[14][16]; | 224 |
| MP3_L2_alloc_table1[15][16]; | 240 |
| MP3_L2_alloc_table2[4][16]; | 64 |
| MP3_L2_alloc_table3[6][16]; | 96 |
| MP3_L2_alloc_table4[15][16]; | 240 |
| *MP3_L2_alloc_tables[5]; | 5 |
| MP3_L2_alloc_sblim[5]; | 5 |
| MP3_D_val_tab[17]; | 17 |
| MP3_II_SBSType[16]; | 16 |
| MP3_I_D_val_tab[16]; | 16 |
| MP3_num_sf_tab[4]; | 4 |
| MP3_Modulo3_tab[64]; | 64 |
| MP3_SF_shift_tab[64]; | 64 |
| MP3_Combined_SFC_tab[19][3]; | 114 |
| MP3_Combined_SFC_shift_tab[19][3]; | 57 |
| MP3_group_lookup[19]; | 19 |
| MP3_steps_lookup[19][2]; | 38 |
| MP3_bits_lookup[19]; | 19 |
| MP3_jsb_table[3][4]; | 12 |
| Tables for Hybrid | |
| MP3_win [4][36] | 288 |
| MP3_imdct_bigCOS[36 + 12] | 96 |
| MP3_imdct_bigCOS2[324] | 648 |
| Data for Hybrid | |
| prevblck[2][SBLIMIT][SSLIMIT] | 2304 |
| Tables for Sub-Band Synthesis | |
| MP3_fixed_A8[8][8] | 128 |
| MP3_fixed_B8[8][8] | 128 |
| MP3_fixed_B16[16][16] | 512 |
| MP3_FilterCoeff[31*16+8] | 1008 |
| MP3_delay_state_tab_even[16] | 16 |
| MP3_delay_state_tab_odd[16] | 16 |
| Data for Sub-Band Synthesis | |
| delay1[NUM_CHANNELS][2][17][8] | 1088 |
| delay2[NUM_CHANNELS][2][17][8] | 1088 |

| Layer 3 | Table Sizes 16 bits words |
|---|---|
| Tables for header parsing | |
| MP3_bitrate[2][3][15] | 90 |
| MP3_size_conv[2][4] | 8 |
| MP3_decode_info_N[12] | 12 |
| MP3_MainDataSlots[2][4][15] | 90 |
| MP3_III_gsi_N_1[5] | 5 |
| MP3_III_gsi_N_2[8] | 8 |
| MP3_III_gsi_N_3[8] | 8 |
| MP3_slen[2][16] | 32 |
| MP3_nr_of_sfb_block[6][3][4] | 72 |
| Tables for Huffman decode | |
| MP3_FHDQ_case_tab | 16 |
| MP3_FHD_tab[512] | 512 |
| MP3_exp_pow_1_3_combined[4*16] | 64 |
| MP3_pow_1_3[1024] | 1024 |
| struct huffcodetab MP3_ht[HTN] | 102 |
| *MP3_HuffLookupTable[HTN] | 34 |
| MP3_LookupSize[HTN] | 34 |
| MP3_HuffTree_1[7] | 7 |
| MP3_HuffTree_2[17] | 17 |

-continued

| Layer 3 | Table Sizes 16 bits words |
|---|---|
| MP3_HuffTree_3[17] | 17 |
| MP3_HuffTree_5[31] | 31 |
| MP3_HuffTree_6[31] | 31 |
| MP3_HuffTree_7[71] | 71 |
| MP3_HuffTree_8[71] | 71 |
| MP3_HuffTree_9[71] | 71 |
| MP3_HuffTree_10[127] | 127 |
| MP3_HuffTree_11[127] | 127 |
| MP3_HuffTree_12[127] | 127 |
| MP3_HuffTree_13[511] | 511 |
| MP3_HuffTree_15[511] | 511 |
| MP3_HuffTree_16[511] | 511 |
| MP3_HuffTree_24[512] | 512 |
| MP3_HuffTree_32[31] | 31 |
| MP3_HuffTree_33[31] | 31 |
| MP3_LookupTab_1[8] | 8 |
| MP3_LookupTab_2[64] | 64 |
| MP3_LookupTab_3[64] | 64 |
| MP3_LookupTab_5[64] | 64 |
| MP3_LookupTab_6[64] | 64 |
| MP3_LookupTab_7[64] | 64 |
| MP3_LookupTab_8[64] | 64 |
| MP3_LookupTab_9[64] | 64 |
| MP3_LookupTab_10[64] | 64 |
| MP3_LookupTab_11[64] | 64 |
| MP3_LookupTab_12[64] | 64 |
| MP3_LookupTab_13[256] | 256 |
| MP3_LookupTab_15[256] | 256 |
| MP3_LookupTab_16[256] | 256 |
| MP3_LookupTab_24[256] | 256 |
| MP3_LookupTab_32[64] | 64 |
| MP3_LookupTab_33[16] | 16 |
| Tables for Dequantization | |
| MP3_global_scale_tab[4] | 8 |
| MP3_pow_m05_tab[2] | 4 |
| MP3_pretab[22] | 22 |
| MP3_pretab_null[22] | 22 |
| Tables for Stereo decode | |
| MP3_tan_table1[16] | 32 |
| MP3_tan_table2[16] | 32 |
| MP3_pow_table1[16] | 32 |
| MP3_pow_table2[16] | 32 |
| Tables for Anti-Aliasing | |
| MP3_cs_ca[16] | 32 |
| Tables for Hybrid | |
| MP3_win [4][36] | 288 |
| MP3_mdct_bigCOS[36 + 12] | 96 |
| MP3_mdct_bigCOS2[324] | 648 |
| Data for Hybrid | |
| prevblck[2][SBLIMIT][SSLIMIT] | 2304 |
| Tables for Sub-Band Synthesis | |
| MP3_fixed_A8[8][8] | 128 |
| MP3_fixed_B8[8][8] | 128 |
| MP3_fixed_B16[16][16] | 512 |
| MP3_FilterCoeff[31*16+8] | 1008 |
| MP3_delay_state_tab_even[16] | 16 |
| MP3_delay_state_tab_odd[16] | 16 |
| Data for Sub-Band Synthesis | |
| delay1[NUM_CHANNELS][2][17][8] | 1088 |
| delay2[NUM_CHANNELS][2][17][8] | 1088 |

As can be seen, storing each of the foregoing tables in the on-chip memory 310 would disadvantageously increase the requirements for the on-chip memory 310. However, accessing the tables from the off-chip memory by each component of the audio decoder 205 would be inefficient and slow.

The processing speed requirements are less memory requirements by storing the tables in the off-chip memory 320, and loading the tables used by each portion (e.g., header and bit allocation information processing module 210, a side information decoder 215, a scalar 220, a Huffman decoder 225, an inverse quantizer 230, joint stereo module 235, an alias reducer 240, an IMDCT module 245, synthesis subband filter 250) when the portion is decoder the encoded AES.

Figure 4:
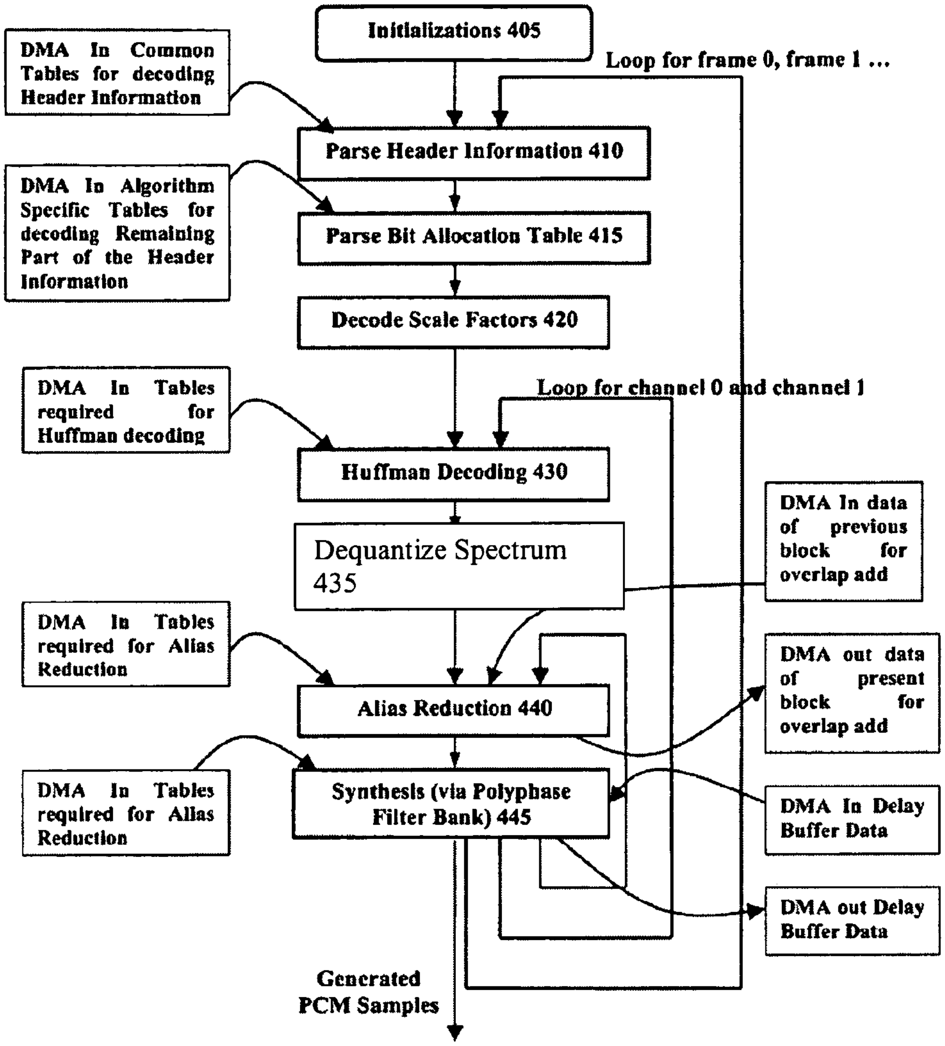
FIG. 4 is a flow diagram for decoding audio signal in accordance with an embodiment of the present invention, where the audio signal is encoded with MPEG-1, Layer 1 or 2.

Referring now to FIG. 4, there is illustrated a flow diagram describing the decoding of layer 1 encoded audio data. At 405, the audio decoder initializes. At 410, the audio decoder 205 parses the header information. Additionally, during 410, the audio decoder 205 makes a direct memory access (DMA) to fetch and load the tables for decoding the header information into the on-chip memory 310.

At 415, the audio decoder 205 parses the bit allocation table. Additionally, during 415, the audio decoder 205 makes a direct memory access (DMA) to fetch and load the algorithm specific tables for decoding the remaining part of the header information into the on-chip memory 310. During 420, the audio decoder decodes the scale factors with the tables stored in the on-chip memory 310.

At 430, the audio decoder 205 decodes the Huffman coding. Additionally, during 430, the audio decoder 205 makes a direct memory access (DMA) to fetch and load the Huffman tables for decoding the Huffman code into the on-chip memory 310. During 435, the audio decoder dequantizes the scale factors with the tables stored in the on-chip memory 310.

At 440, the audio decoder 205 reduces the aliasing. Additionally, during 440, the audio decoder 205 makes a direct memory access (DMA) to fetch and load the tables for alias reduction and data from a previous block for overlap add into the on-chip memory 310, and writes output data for the overlap add to the off-chip memory 320.

At 445, the audio decoder 205 synthesizes and filters subbands. Additionally, during 445, the audio decoder 205 makes a direct memory access (DMA) to fetch and load the tables for alias reduction and delay buffer data from earlier, into the on-chip memory 310, and writes output delay buffer data to the off-chip memory 320.

Figure 5:
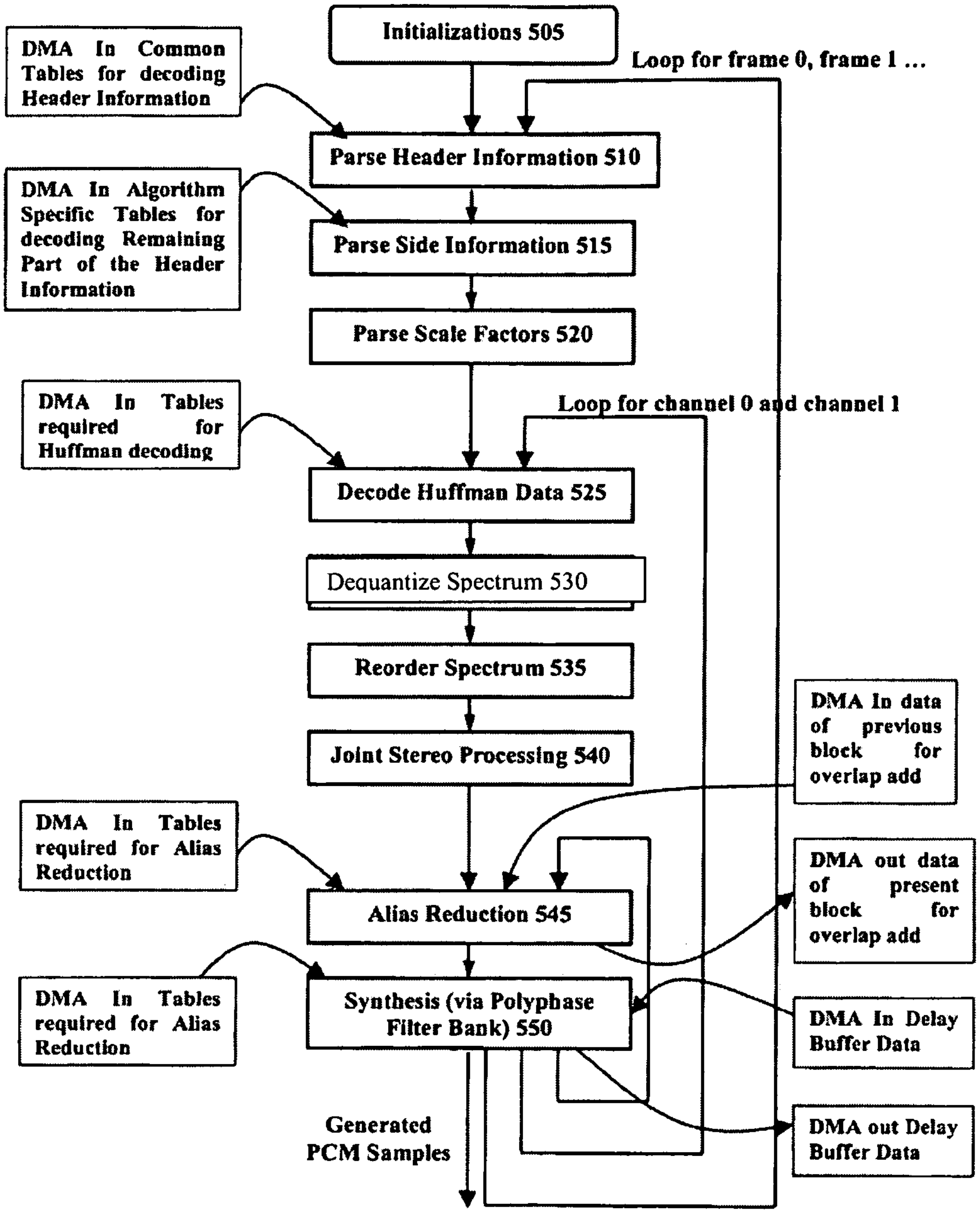
FIG. 5 is a flow diagram for decoding audio signal in accordance with an embodiment of the present invention, where the audio signal is encoded with MPEG-1, Layer 3.

Referring now to FIG. 5, there is illustrated a flow diagram describing the decoding of layer 3 encoded audio data. At 505, the audio decoder is initialized. At 510, the audio decoder 205 parses the header information. Additionally, during 510, the audio decoder 205 makes a direct memory access (DMA) to fetch and load the common tables for decoding the header information into the on-chip memory 310.

At 515, the audio decoder 205 parses the side information. Additionally, during 515, the audio decoder 205 makes a direct memory access (DMA) to fetch and load the algorithm specific tables for decoding the remaining part of the header information into the on-chip memory 310. During 520, the audio decoder parses the scale factors with the tables stored in the on-chip memory 310.

At 525, the audio decoder 205 decodes the Huffman coding. Additionally, during 525, the audio decoder 205 makes a direct memory access (DMA) to fetch and load the Huffman tables for decoding the Huffman code into the on-chip memory 310. During 530, 535, and 540, the audio decoder dequantizes, reorders the spectrum, and processes joint stereo information using the tables stored in the on-chip memory 310.

At 545, the audio decoder 205 reduces the aliasing. Additionally, during 545, the audio decoder 205 makes a direct memory access (DMA) to fetch and load the tables for alias reduction and data from a previous block for overlap add into the on-chip memory 310, and writes output data for the overlap add to the off-chip memory 320.

At 550, the audio decoder 205 synthesizes and filters subbands. Additionally, during 550, the audio decoder 205 makes a direct memory access (DMA) to fetch and load the tables for alias reduction and delay buffer data from earlier, into the on-chip memory 310, and writes output delay buffer data to the off-chip memory 320.

The circuit as described herein may be implemented as a board level product, as a single chip, application specific integrated circuit (ASIC), or with varying levels of the system integrated on a single chip with other portions of the system as separate components. The degree of integration of the monitoring system may primarily be determined by speed of incoming MPEG packets, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the memory storing instructions is implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for decoding encoded audio signals, said method comprising:

- fetching a first one or more tables from an off-chip memory;
- loading the first one or more tables into an on-chip memory;
- applying a first function to the encoded audio signals using the first one or more tables, wherein the first function is applied to the encoded audio signals via a first hardware accelerator unit within an audio decoder;
- fetching a second one or more tables from an off-chip memory after applying the first function;
- loading the second one or more tables into an on-chip memory;
- applying a second function to the encoded audio signals, using the second one or more tables, wherein the second function is applied to the encoded audio signals via a second hardware accelerator unit within the audio decoder; and
- wherein all tables stored in the off-chip memory occupy approximately 50 KB.

2. The method of claim 1 wherein the first and second function are selected from a group consisting of:

- header information parsing;
- side information parsing;
- scale factor parsing;
- Huffman data decoding;
- inverse quantization;
- joint stereo processing; and
- alias reduction.

3. The method of claim 1, wherein the encoded audio signals comprise an audio elementary stream.

4. The method of claim 1, wherein the on-chip memory comprises static random access memory.

5. The method of claim 1, wherein the off-chip memory comprises dynamic random access memory.

6. The method of claim 1, wherein the encoded audio signals comprise MPEG formatted data.

7. The method of claim 6, wherein each layer of the encoded audio signals is decoded.

8. An integrated circuit for decoding encoded audio signals, said integrated circuit comprising:

- a direct memory access module for fetching a first one or more tables from an off-chip memory;
- memory for storing the first one or more tables;
- an audio decoder having a first hardware accelerator unit for applying a first function to the encoded audio signals using the first one or more tables;
- the direct memory access module fetching a second one or more tables from an off-chip memory after the audio decoder applies the first function;
- the memory storing the second one or more tables;
- the audio decoder having a second hardware accelerator unit for applying a second function to the encoded audio signals, using the second one or more tables; and
- wherein all tables stored in the off-chip memory occupy approximately 50 KB.

9. The integrated circuit of claim 8, wherein the first and second function are selected from a group consisting of:

- header information parsing;
- side information parsing;
- scale factor parsing;
- Huffman data decoding;
- inverse quantization;
- joint stereo processing; and
- alias reduction.

10. The integrated circuit of claim 8, wherein the encoded audio signal comprise an audio elementary stream.

11. The integrated circuit of claim 8, wherein the memory comprises static random access memory.

12. The integrated circuit of claim 8, wherein the off-chip memory comprises dynamic random access memory.

13. The integrated circuit of claim 8, wherein the encoded audio signals comprise MPEG formatted data.

14. The integrated circuit of claim 13, wherein the integrated circuit decodes each layer of the encoded audio signals.

15. An integrated circuit for decoding encoded audio signals, said integrated circuit comprising:

- a memory;
- a direct memory access module connected to the memory, the direct memory access module operable to fetch a first one or more tables from another memory and write the first one or more tables to the memory;
- an audio decoder operably connected to access the first tables from the memory, the audio decoder having a first accelerator unit equipped to apply a first function to the encoded audio signals using the first one or more tables;
- the direct memory access module operable to fetch a second one or more tables from the another memory after the audio decoder applies the first function and write the second one or more tables to the memory;
- the audio decoder having a second accelerator unit equipped to apply a second function to the encoded audio signals, using the second one or more tables; and
- wherein all tables stored in the another memory occupy approximately 50 KB.

16. The integrated circuit of claim 15, wherein the first and second function are selected from a group consisting of:

- header information parsing;
- side information parsing;

scale factor parsing;
Huffman data decoding;
inverse quantization;
joint stereo processing; and
alias reduction.

17. The integrated circuit of claim 15, wherein the encoded audio signal comprises an audio elementary stream.

18. The integrated circuit of claim 15, wherein the memory comprises static random access memory.

19. The integrated circuit of claim 15, wherein the encoded audio signals comprise MPEG formatted data.

20. The integrated circuit of claim 19, wherein the integrated circuit decodes each layer of the encoded audio signals.

* * * * *